July 22, 1952 | W. D. GOODALE, JR | 2,604,543

EQUALIZER CIRCUIT

Filed Nov. 9, 1950

INVENTOR
W. D. GOODALE, JR.
BY M. B. McKenney
ATTORNEY

Patented July 22, 1952 2,604,543

UNITED STATES PATENT OFFICE 2,604,543

EQUALIZER CIRCUIT

Walter D. Goodale, Jr., Summit, N. J., assignor to Bell Telephone Laboratories, Incorporated, New York, N. Y., a corporation of New York Application November 9, 1950, Serial No. 194,870

4 Claims. (Cl. 179—81)

Figure 1:
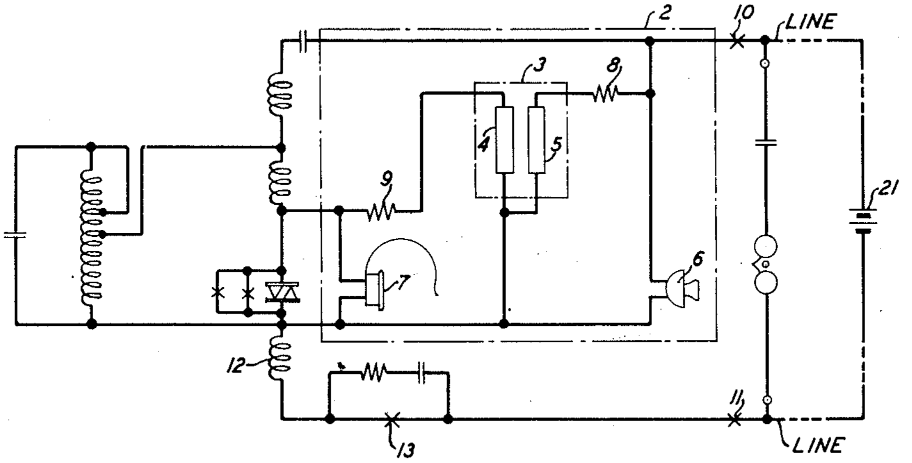

This invention relates to improvements in volume equalizer circuits for telephone station sets. Such sets are ordinarily located in telephone subscribers' premises and are used by telephone subscribers to communicate with distant parties.

An object of this invention is the improved equalization of a telephone station set whereby the reception and transmission amplitude levels of voice signals for said station set will be substantially independent of the length of transmission line connecting said station set to the central office serving said station set.

Another object of this invention is the elimination of circuit components in volume equalizer circuits heretofore used which have been susceptible to frequent failure from ordinary subscriber station set use.

Another object of this invention is an equalizer circuit which utilizes components whose design includes the features of long life, mechanical ruggedness, and economy in space and cost.

A further object of this invention is an equalizer circuit which may be incorporated in a plurality of the telephone station sets within a given service area by utilizing circuit components of the same design and value, regardless of the distance between a particular subscriber's substation and the telephone office supplying the station set energizing current, thereby simplifying the installation and repair procedures to be followed by telephone maintenance personnel.

As is well known, subscribers' premises are located at various distances, within a permissible range, from a telephone switching office and also in many instances conductors of different cross-sectional areas are employed in the interconnections. As a result of these factors, as well as others, there is considerable variation in the amplitude of signals received and transmitted by different subscribers unless some means are employed to compensate for the differences. In a volume equalizer circuit disclosed in a copending application of E. I. Green, Serial No. 155,329, filed April 11, 1950, two negative temperature coefficient resistance elements are employed to effectuate equalization, one in shunt connection with the receiver and one in shunt connection with the transmitter of the station set being equalized. Both of said shunt elements are thermally coupled to a heater element whose heat energy transfer to said shunt elements varies inversely to the resistance of the telephone loop connecting the equalized station set to its telephone switching office thereby making both transmission and reception voice signal amplitude levels substantially independent of the characteristics and length of the subscriber's line.

The circuit of this invention differs from this prior art structurally in that a single component is utilized to equalize the station set thereby greatly minimizing equipment and installation costs. In particular, the equalizer component comprises two flakes of material having a negative temperature coefficient of resistance. The two flakes are thermally coupled to one another by sandwiching the flakes between suitable electrodes, and the combination thereof is enclosed in a heremetically sealed containing envelope.

In a preferred embodiment the equalizer circuit component is contained in a station set housing unit with the appropriate circuit connections being made to the transmitter and receiver terminals. One flake is connected in shunt with the transmitter and the other flake is connected in shunt with the receiver. The station set energizing current passes in part through the transmitter shunting flake thereby directly heating same, and indirectly heating the receiver shunting flake which is thermally coupled thereto. If the telephone loop to the energizing source at the central office is of high resistance both flakes are heated to a lesser degree than if the telephone loop is of lower resistance. In such a manner the receiver and transmitter amplitudes of different substations within a particular telephone service area are equalized by changing the receiver-transmitter shunt resistance values inversely to the amplitude of the station set energizing current. Consequently, the operation of a particular subscriber's station set is made substantially independent of the location of said station set with respect to the central office serving said set.

The resistance elements utilized in the circuit of this invention are constructed of substance commonly known in the art as "thermistor" material. By operating along an appropriate portion of the temperature-resistance characteristic of the thermistor flakes used, the changes in the resistance of these elements will be such as to compensate to a great extent for the difference in telephone station set energizing current caused by different loop lengths or loop resistances to the telephone switching office where the station set energizing current battery is usually located. Detailed explanation of the operation and characteristics of thermistors may be derived from the following articles: "Varistors: Their Characteristics and Uses," J. A. Becker, Bell Laboratories Record, volume 18, July 1940, pages 322–327; "Thermistors: Their Characteristics and Uses," G. L. Pearson, Bell Laboratories Record, volume 19, December 1940, pages 106–111.

An advantageous feature of the circuit of this invention is that station set maintenance problems are simplified because failure of the shunting flakes does not prevent operation of the station set; whereas, in equalizer circuits employing series resistance elements having a positive temperature coefficient of resistance, failure of the series element will usually open the transmitter circuit thereby preventing operation of the station set. Furthermore, the thermistor flakes used in the circuit of this invention operate at a relatively low temperature, therefore, they are not easily broken by rough handling of the subscriber's station set; whereas, equalizer elements which operate at a high temperature usually become brittle and, consequently, are more susceptible to failure from mechanical shock or vibration occasioned by rough handling of the station set housing unit which usually houses the equalizer circuit components.

Figure 2:
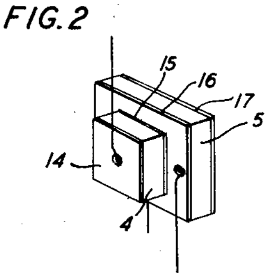
Figure 3:
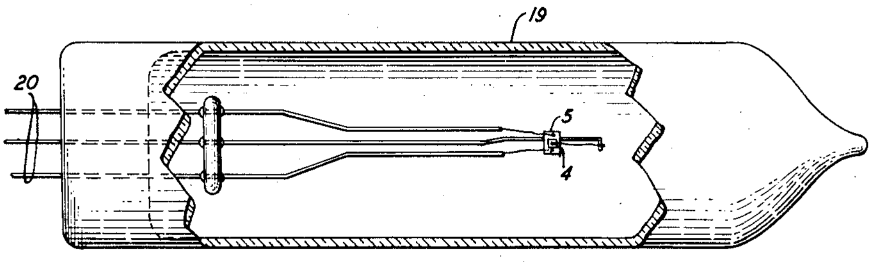

In order that the invention may be clearly understood, reference is herein made to the drawing wherein:

Fig. 1 shows the equalizer circuit of this invention substituted for the tungsten filament equalizer of the station set circuit disclosed in Fig. 1 of a copending patent application of Botsford-Boysen-Aikens-Dietze-Goodale-Inglis, Serial No. 793,170, filed December 22, 1947. Detailed reference will be made only to the circuit components which comprise the equalizer circuit disclosed herein or which closely cooperate with said equalizer circuit. The function and operation of other circuit components shown schematically but not referred to are described in detail in the aforementioned application of Botsford et al.;

Fig. 2 is a perspective view of the "thermistor" sandwich utilized in the circuit of Fig. 1; and Fig. 3 shows the "thermistor" sandwich of Fig. 2 enclosed within a containing vessel suitable for incorporation in a station set housing unit.

In Fig. 1 the improved equalizer circuit, together with the station set transmitter 6 and receiver 7, is included within dotted line enclosure 2. The "thermistor" sandwich comprising flakes 4 and 5, constructed of material having a negative temperature coefficient of resistance, is enclosed within dotted line enclosure 3. Flake 5 shunts transmitter 6 through resistor 8 and flake 4 shunts receiver 7 through resistor 9. Flake 5 is directly heated by current from battery 21 which supplies the station set energizing current through a circuit which includes the Line conductors. Battery 21 in common battery telephone installations is usually located at the telephone switching or central office which serves the particular station set.

When an electrical current passes through flake 5 part of the heat energy developed therein is transferred to flake 4 by the thermocoupling sandwiching arrangement shown in Fig. 2 thereby heating flake 4. Consequently, the shunting resistance values of both flakes 4 and 5 vary inversely to the amplitude of the station set energizing current supplied by battery 21. In general, therefore, if the station set energizing current is small the transmission and reception voice signals of transmitter 6 and receiver 7, respectively, are shunted to a lesser extent than if the station set energizing current is larger in value. In this manner equalized station sets which are located different distances from the energizing battery source generate and receive voice signals which are substantially independent of the characteristics of the connecting conductors.

The detailed operation of the equalizer circuit of Fig. 1 is as follows: When the telephone handset which mechanically couples the transmitter 6 and the receiver 7 to one another, is lifted from the station set housing unit, switchhook contacts 10 and 11 are closed and energizing current from central office battery 21 flows through the transmitter 6 in a circuit which includes the upper Line conductor, closed switchhook contact 10, transmitter 6, winding 12, closed dial contact 13, closed switchhook contact 11, and the lower Line conductor. Inasmuch as the resistor 8-thermistor flake 5 subcombination shunts transmitter 6, a portion of the energizing current supplied by battery 21 passes therethrough causing heat energy to be developed within flake 5. A portion of said energy is transferred to flake 4 which is closely coupled thereto thereby causing both flakes to assume a lower resistance value than that assumed by the flakes when the station set is not in operation.

On a short telephone loop, the current passing through flake 5 will be greater than that on a longer loop due to the increased resistance of the loop conductors. Consequently, thermistor flakes 4 and 5 will assume a higher temperature on the shorter telephone loop and therefore lower resistance values. Due to the increased shunting effect of flake 5 on short loops the transmitter 6 energizing current is kept to a value which is substantially equal to that provided by longer loop connections while its voice signal output is simultaneously held to an average value. Likewise, the increased shunting effect of flake 4 upon receiver 7 causes the reception signals to have an average value which is substantially equal to that of longer loop connections. It is to be noted that the alternating-current voice signal components have little effect upon flakes 4 and 5 due to their small heating component values as compared to the heating component values of the direct current from battery 21. Furthermore, inasmuch as thermistors have inherent time delays before responding to current changes therethrough, the voice signal fluctuations have no appreciable effect upon the equalization of the station set.

The inclusion of resistor 8, in series with flake 5, facilitates design of flake 5 and also tends to prevent a "runaway" condition which might occur because lowering of the resistance of flake 5 increases the current through flake 5 which further lowers the resistance of said flake. Resistor 9 prevents excessive shunting of receiver 7 by flake 4.

The construction of the thermistor sandwich is shown in perspective in Fig. 2. The complete component in one sense may be said to comprise two sandwiches. A receiver sandwich which includes flake 4 of approximately 20 microns' thickness fixed between electrodes 14 and 15 which are preferably constructed of platinum; and a transmitter sandwich which includes flake 5 of approximately 20 microns' thickness fixed between electrodes 16 and 17 which are also preferably constructed of platinum. The two sandwiches are fixed to one another so that heat energy developed in flake 5 when current passes therethrough is conducted without appreciable loss to flake 4. The thermistor flakes are preferably constructed from a compound of manganese oxide and nickel oxide in a manner disclosed in United States Patent 2,258,646, issued October 14, 1941, to R. Grisdale.

The sandwiching arrangement of Fig. 2 is enclosed within envelope 19 shown in Fig. 3 which is sealed with air at atmospheric pressure. Connections thereto are made at terminals 20. The entire assembly is preferably located in modern type subsets within the housing unit thereof.

It is to be understood that the above-described arrangements are illustrative of the aplication of the principles of the invention. Numerous other arrangments may be devised by those skilled in the art without departing from the scope of the invention.

What is claimed is:

1. In a telephone circuit including a receiver, a transmitter, a direct-current energizing source and a plurality of electrical conductors connecting said direct-current energizing source to said transmitter, the combination comprising a first resistance element having a negative temperature coefficient of resistance in shunt connection with said receiver, a second resistance element having a negative temperature coefficient of resistance in shunt connection with said transmitter, and said first and second resistance elements being thermally coupled to one another by close physical positioning of said elements with respect to one another so that current through said second resistance element heats both resistance elements thereby varying the receiver and transmitter shunting resistance values inversely to the resistance of the conductors connecting said direct-current energizing source to said transmitter.

2. In a telephone circuit including a receiver, a transmitter, a direct-current energizing source and a plurality of electrical conductors connecting said direct-current energizing source to said transmitter, the combination comprising a first resistance element having a negative temperature coefficient of resistance in shunt connection with said reeciver, a second resistance element having a negative temperature coefficient of resistance in shunt connection with said transmitter, and a plurality of electrodes sandwiching said first and second resistance elements so that said elements are thermally coupled to one another whereby current through said second resistance element heats both resistance elements thereby varying the receiver and transmitter shunting resistance values inversely to the resistance of the conductors connecting said direct-current energizing source to said transmitter.

3. In a telephone circuit including a receiver, a transmitter, a direct-current energizing source and a plurality of electrical conductors connecting said direct-current energizing source to said transmitter, the combination comprising a resistance element having a negative temperature coefficient of resistance, a limiting resistor in series therewith and the combination thereof in shunt connection with said receiver, a second resistance element having a negative temperature coefficient of resistance, a second limiting resistor in series therewith and the combination thereof in shunt connection with said transmitter, and said resistance elements being thermally coupled to one another by close physical positioning so that current through said transmitter shunting resistance element heats both resistance elements thereby varying the receiver and transmitter shunting resistance values inversely to the resistance of the conductors connecting said direct-current energizing source to said transmitter.

4. In a telephone circuit including a receiver, a transmitter, an energizing source and means for connecting said energizing source to said transmitter, the improvement which comprises a resistance element having a negative temperature coefficient of resistance shunting said transmitter whereby the resistance value of said transmitter shunting element varies inversely to the potential value applied to said transmitter by said energizing source through said connecting means, a second resistance element having a negative temperature coefficient of resistance thermally coupled to said first resistance element, and said second resistance element shunting said receiver whereby the shunting resistance value thereof varies inversely to the potential value applied to said transmitter by said energizing source.

WALTER D. GOODALE, Jr.

REFERENCES CITED

The following references are of record in the file of this patent:

UNITED STATES PATENTS

| Number | Name | Date |
|---|---|---|
| 2,287,998 | Johnson | June 30, 1942 |
| 2,288,049 | Tillman | June 30, 1942 |
| 2,387,269 | Johnson | Oct. 23, 1945 |